US010640604B2

(12) United States Patent
Ludewig et al.

(10) Patent No.: US 10,640,604 B2
(45) Date of Patent: May 5, 2020

(54) OXIDATIVELY DRYING POLYURETHANE DISPERSIONS WITH PARTICULARLY HIGH CHEMICAL RESISTANCE

(71) Applicant: Covestro Deutschland AG, Leverkusen (DE)

(72) Inventors: Michael Ludewig, Odenthal (DE); Maria Almato Guiteras, Köln (DE); Pantea Nazaran, Köln (DE); Eva Tejada Rosales, Barcelona (ES)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/370,066

(22) Filed: Dec. 6, 2016

(65) Prior Publication Data

US 2017/0166685 A1 Jun. 15, 2017

(30) Foreign Application Priority Data

Dec. 10, 2015 (EP) .................................... 15199189

(51) Int. Cl.

| | |
|---|---|
| ***C08G 18/08*** | (2006.01) |
| ***C08G 18/10*** | (2006.01) |
| ***C08G 18/12*** | (2006.01) |
| ***C08G 18/24*** | (2006.01) |
| ***C08G 18/32*** | (2006.01) |
| ***C08G 18/34*** | (2006.01) |
| ***C08G 18/36*** | (2006.01) |
| ***C08G 18/67*** | (2006.01) |
| ***C08G 18/75*** | (2006.01) |
| ***C09D 175/14*** | (2006.01) |
| ***C09F 9/00*** | (2006.01) |

(52) U.S. Cl.

CPC ....... *C08G 18/675* (2013.01); *C08G 18/0823* (2013.01); *C08G 18/10* (2013.01); *C08G 18/12* (2013.01); *C08G 18/244* (2013.01); *C08G 18/3212* (2013.01); *C08G 18/3228* (2013.01); *C08G 18/3234* (2013.01); *C08G 18/348* (2013.01); *C08G 18/36* (2013.01); *C08G 18/758* (2013.01); *C09D 175/14* (2013.01); *C09F 9/00* (2013.01)

(58) Field of Classification Search

CPC ..... C09F 9/00; C08G 18/675; C08G 18/0823; C08G 18/12; C08G 18/3212; C08G 18/348; C08G 18/758; C08G 18/10; C08G 18/244; C08G 18/3228; C08G 18/3234; C08G 18/36; C09D 175/14

See application file for complete search history.

(56) References Cited

U.S. PATENT DOCUMENTS

| | | | | |
|---|---|---|---|---|
| 4,046,729 A * | 9/1977 | Scriven | C08G 18/0804 | 106/243 |
| 5,004,779 A | 4/1991 | Blum et al. | | |
| 5,039,732 A | 8/1991 | Arora | | |
| 5,252,696 A | 10/1993 | Laas et al. | | |
| 5,684,081 A | 11/1997 | Dannhorn et al. | | |
| 6,559,225 B1 | 5/2003 | Irle et al. | | |
| 2009/0264587 A1 * | 10/2009 | Blum | C08G 18/0823 | 524/591 |

FOREIGN PATENT DOCUMENTS

| | | |
|---|---|---|
| CA | 2148550 A1 | 11/1995 |
| EP | 0017199 A1 | 10/1980 |
| EP | 0709414 A1 | 5/1996 |
| JP | H06340842 A | 12/1994 |
| WO | 9719120 | 5/1997 |

OTHER PUBLICATIONS

Odian, George, Principles of Polymerization, 1991, pp. 29-33.*

D. Dieterich, Aqueous Emulsions, Dispersions and Solutions of Polyurethanes; Synthesis and Properties, Progress in Organic Coatings, vol. 9, (1981) pp. 281-340. Elsevier Sequoia S.A., Lausanne.

K.C. Frisch, D. Klempner (Eds.) J.W. Rosthauser, et al., Waterborne Polyurethanes, Advances in Urethane Science and Technology, vol. 10, 1987, pp. 121-162.

Methoden der Orgnischen Chemie (Houben Weyl), 4th Edition, vol. E20/Part 2, p. 1682, Georg Thieme Verlag, Stuttgart, 1987.

* cited by examiner

*Primary Examiner* — Patrick D Niland

(74) *Attorney, Agent, or Firm* — Richard P. Bender; John E. Mrozinski, Jr.

(57) ABSTRACT

The present invention relates to hydrophilized polyurethanes having a particularly high content of hydroxy-functional, unsaturated triglycerides, to a process for preparing polyurethane dispersions based thereon, to the use of the dispersions as binders in oxidatively drying coating materials having particularly high chemical resistance, and to articles and substrates coated with these coating materials.

14 Claims, No Drawings

OXIDATIVELY DRYING POLYURETHANE DISPERSIONS WITH PARTICULARLY HIGH CHEMICAL RESISTANCE

CROSS REFERENCE TO RELATED APPLICATION

The present application claims priority under the Paris Convention to European Application No. 15199189.0, filed Dec. 10, 2015, in the European Patent Office the entire contents of which is incorporated herein by reference.

FIELD OF THE INVENTION

The present invention relates to hydrophilized polyurethanes having a particularly high content of hydroxy-functional, unsaturated triglycerides, to a process for preparing polyurethane dispersions based thereon, to the use of the dispersions as binders in oxidatively drying coating materials having particularly high chemical resistance, and to articles and substrates coated with these coating materials.

BACKGROUND OF THE INVENTION

Aqueous coating compositions are a now-established substitute for solventborne systems. One important class of aqueous binders are the polyurethane dispersions (D. Dieterich, Prog. Org. Coatings 9, 281(1981)), which unite the most important qualities of resistance towards chemicals and mechanical loading. Especially in the area of the coating of surfaces subject to severe mechanical stress, therefore, the use of polyurethane dispersions is an advantage.

In respect especially of the chemical resistance a further improvement can be achieved by chemically crosslinking the coatings. One way of achieving this is the crosslinking of aqueous binders which carry OH or NH groups by means of hydrophilized polyisocyanates (EP-B-0540985). Aqueous 2 k (two-component) polyurethane coating materials of this kind attain a very high level of properties, but the application procedure is comparatively costly and inconvenient and may represent a barrier, particularly in the case of artisanal use.

Another way is to use UV-crosslinkable polyurethane dispersions, with which likewise excellent properties can be attained. Such binders generally contain activated double bonds, such as acrylate groups, for example (EP-B-0753531), and are established in particular in the industrial coating of sheet-like substrates. Not in every application, however, is it practicable to perform crosslinking with actinic radiation following application.

A likewise established way, therefore, is to use polyurethane dispersions having non-activated double bonds, which have air-drying properties (Advances in Urethane Science and Technology, K. C. Frisch, D. Klempner (Eds.) Vol. 10, p. 121 ff. (1987)). Coatings comprising such binders crosslink through reaction with atmospheric oxygen (auto-oxidative crosslinking) and can therefore be employed in one-component form, and crosslink without further input by the user.

Dispersions of this kind containing urethane groups and air-drying components are further described in EP-A-0017199, EP-B-0379007, WO199719120, DE-A-4416336, U.S. Pat. No. 5,039,732 and JP-A-6340842. A disadvantage of these auto-oxidatively crosslinkable polyurethane dispersions, however, is that the mechanical properties of the coating film do not achieve the high level of the purely physically drying polyurethane dispersions. This is manifested, for example, in impaired abrasion resistance.

An improvement in the abrasion resistance can be achieved by systems based on modified, OH-functional triglycerides. One such aqueous polyurethane binder is described in EP-B-0709414. In that case dehydrated castor oil is used. As a result of the dehydration, OH groups of the ricinoleic acid are converted into double bonds, and so the sum total of the OH groups and double bonds always remains the same.

More flexible, therefore, is the process presented in EP-B-1198487, in which the castor oil is mixed with another, non-functional, triglyceride and the mixture is then subjected to transesterification. Polyurethane dispersions based on this process already have very good properties in terms of mechanical and chemical resistance, and can be employed very effectively in, for example, high-grade floor coatings. Nevertheless, they still do not achieve the particularly high level of properties of radiation-curable polyurethane dispersions or of 2 k polyurethane dispersions, each of which achieve much higher crosslinking density.

SUMMARY OF THE INVENTION

The present invention provides polyurethanes for use in oxidatively drying polyurethane dispersions that exhibit significantly increased chemical resistance without at the same time losing the very good mechanical properties.

On the basis of EP-B-1198487, this is achieved by means of polyurethanes which on the one hand have a particularly high fraction of oxidatively drying triglycerides and on the other hand have a high fraction of cycloaliphatic diisocyanates and chain extenders.

It is understood that the invention disclosed and described in this specification is not limited to the embodiments summarized in this Summary

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides polyurethanes A), which comprise at least as synthesis components

- A1) 40 to 60 wt % of an oxidatively drying, OH-functional triglyceride,
- A2) 30 to 55 wt % of 4,4'-diisocyanato-dicyclohexylmethane,
- A3) 3 to 15 wt % of one or more cycloaliphatic diols,
- A4) 1 to 20 wt % of a compound having at least one isocyanate-reactive group and at least one ionic and/or potentially ionic function,
- A5) 1 to 20 wt % of one or more mono-, di- or triamines having a molecular weight of less than 300 g/mol,
- A6) 0 to 10 wt % of a neutralizing agent for converting a potentially ionic function, where present, of component A4) into an ionic function, and
- A7) 0 to 5 wt % of a urethanization catalyst, characterized in that the figure in wt % is based on the total amount of all synthesis components, and the sum total of all the components does not exceed 100%.

In one preferred embodiment of the invention, the polyurethane A) consists of the synthesis components A1) to A7).

In this case the sum total of all the components, based on the total amount of the synthesis components A1) to A7), is 100%.

OH-functional triglycerides A1) suitable in accordance with the invention are triple esters of glycerol with the same or, preferably, different fatty acids, which at least partly also have OH groups. A preferred, suitable fatty acid carrying OH groups is ricinoleic acid, though it is also conceivable for OH groups to be introduced into the triglyceride through chemical modification of other fatty acids.

Moreover, non-OH-functional fatty acids may also be included in part in the triglyceride A1). In this case, suitable fatty acids include not only those of medium length (6 to 12 carbon atoms) but also those of high length (14 to 24 carbon atoms). Suitable fatty acids preferably contain one or more double bonds as well, in order to ensure the oxidative drying of the polyurethane binder. Examples of fatty acids having one double bond are undecylenic acid, myristoleic acid, palmitoleic acid, petroselinic acid, oleic acid, elaidic acid, vaccenic acid, gadoleic acid, icosenoic acid, cetoleic acid, erucic acid or nervonic acid. Examples of fatty acids having two or more double bonds are linoleic acid, α-linolenic acid, γ-linolenic acid, calendulic acid, punicic acid, α-elaeostearic acid, β-elaeostearic acid, arachidonic acid, timnodonic acid, clupanodonic acid, cervonic acid. In minor amount it is also possible for saturated fatty acids to be included, such as, for example, lauric acid, myristic acid, palmitic acid, stearic acid, arachidic acid, behenic acid, lignoceric acid.

The triglycerides which can be used in accordance with the invention preferably comprise not only ricinoleic acid but also one or more non-OH-functional fatty acids, such as dehydrated ricinoleic acid, oleic acid, linoleic acid, linolenic acid and, in minor amounts, palmitic acid and/or stearic acid as well. The precise composition is dictated by the natural composition of the vegetable oils used.

In principle it is possible to use castor oil in accordance with the invention as component A1). With natural castor oil, however, the OH functionality is too high and the oxidative drying is insufficient. Accordingly, various processes have been proposed firstly for reducing the OH functionality and secondly for raising the iodine number (double-bond density).

One possibility lies in the partial dehydration of the castor oil, as described in EP0709414.

A further, preferred possibility is the transesterification of a mixture of castor oil with another oil having an iodine number of greater than 50, preferably greater than 75 and more preferably greater than 100, as described in EP1198487. The OH-functional triglyceride is prepared preferably by transesterification of castor oil with soybean oil.

Employed as isocyanate component A2) is 4,4'-diisocyanatodicyclohexylmethane. It is also possible to use small amounts (up to 10 wt %, based on component A2)) of other aliphatic diisocyanates as well. Examples of other aliphatic diisocyanates are 1,6-hexamethylene diisocyanate, 1-isocyanato-3,3,5-trimethyl-5-isocyanatomethylcyclohexane (isophorone diisocyanate or IPDI), 1,3-bis(isocyanatomethyl)benzene (XDI), 1,3-bis(1-isocyanato-1-methylethyl) benzene (TMXDI) and 1,5-pentamethylene diisocyanate (PDI). It is preferred, however, for pure 4,4'-diisocyanatodicyclohexylmethane to be used.

Essential to the invention is the use of the low molecular weight, cycloaliphatic diols A3) in the synthesis of the prepolymer. The low molecular weight, cycloaliphatic diols preferably have a molecular weight of less than 500 g/mol, more preferably one of less than 200 g/mol.

Preferred cycloaliphatic diols are selected from the group consisting of 1,4-cyclohexanediol, 1,2-cyclohexanediol, 1,3-cyclohexanediol, 1,4-cyclohexanedimethanol, 1,2-cyclohexanedimethanol, 1,4-cyclohexenedimethanol, tricyclo [5.2.1.0]decanedimethanol, tricyclo[5.2.1.0]decanediol, hydrogenated bisphenol A (2,2-bis(4-hydroxycyclohexyl) propane), and isosorbide. Particularly preferred is the use of 1,4-cyclohexanedimethanol.

Component A4) comprises compounds having at least one isocyanate-reactive group and additionally at least one ionic and/or potentially ionic group. It has a hydrophilizing effect on the polyurethane (meth)acrylates of the invention.

The groups with hydrophilizing effect include ionic groups A41) and/or ionic groups which originate from potentially ionic groups A42) (by salt formation, for example), which may be anionic in nature, such as carboxylate, sulphonate or phosphonate groups, for example, or cationic in nature, such as ammonium groups, for example, and/or potentially ionic groups A42), i.e. groups which can be converted into ionic groups A41) by salt formation, for example. They are incorporated into the macromolecules by isocyanate-reactive groups. Preferred isocyanate-reactive groups are hydroxyl groups and amino groups.

Compounds containing potentially ionic groups A42) include compounds having potentially anionic groups, such as, for example, mono- and dihydroxycarboxylic acids, mono- and diaminocarboxylic acids, mono- and dihydroxysulphonic acids, mono- and diaminosulphonic acids, mono- and dihydroxyphosphonic acids, mono- and diaminophosphonic acids, and/or compounds having potentially cationic groups, such as, for example, ethanolamine, diethanolamine, triethanolamine, 2-propanolamine, dipropanolamine, tripropanolamine, N-methylethanolamine, N-methyldiethanolamine and N,N-dimethylethanolamine.

Preferred compounds contain potentially anionic groups A42) and are selected from the group consisting of dimethylolpropionic acid, dimethylolbutyric acid, hydroxypivalic acid, N-(2-aminoethyl)alanine, 2-(2-aminoethylamino)ethanesulphonic acid, ethylenediamine-propyl- or -butylsulphonic acid, 1,2- or 1,3-propylenediamineethylsulphonic acid, 3-(cyclohexylamino)propane-1-sulphonic acid, malic acid, citric acid, glycolic acid, lactic acid, glycine, alanine, taurine, lysine, 3,5-diaminobenzoic acid, the adducts of acrylic acid with diamines in a ratio of 1:1, such as, for example, with isophoronediamine (EP-A 916 647, example 1) or with ethylenediamine (PUD salt or N-(2-aminoethyl)-β-alanine), the adduct of sodium bisulphite with but-2-ene-1,4-diol, polyether sulphonate, and the propoxylated adduct of 2-butenediol and $NaHSO_3$, as described in DE-A 2 446 440 on pages 5-9, formulae I-III.

Particularly preferred compounds containing potentially ionic groups A42) are dimethylolpropionic acid, dimethylolbutyric acid and hydroxypivalic acid. Especially preferred is the use of dimethylolpropionic acid.

The acids identified under component A42) are converted into the corresponding salts by reaction with neutralizing agents, such as, for example, triethylamine, ethyldiisopropylamine, dimethylcyclohexylamine, dimethylethanolamine, ammonia, N-ethylmorpholine, LiOH, NaOH and/or KOH (component A6). The degree of neutralization in this case is preferably between 50% and 125%, more preferably between 60% and 100%. The definition of the degree of neutralization is as follows: in the case of acid-functionalized polymers, the ratio of base to acid; in the case of base-functionalized polymers, the ratio of acid to base. Where the degree of neutralization is above 100%, then more base is added than there are acid groups present in the polymer, in the case of acid-functionalized polymers; in the case of base-functionalized polymers, more acid is added than there are base groups in the polymer. Component A42) is neutralized preferably by LiOH, NaOH, KOH, triethyleneamine or ethyldiisopropylamine, more preferably by triethyleneamine or ethyldiisopropylamine, and very preferably by ethyldiisopropylamine. In one alternative embodiment of the invention, which has amine-free operation, it is particularly preferred to carry out neutralization with LiOH, NaOH or KOH.

The compounds listed under component A4) may also be used in mixtures.

In order to increase the weight-average molecular weight $M_w$ of the polyurethane acrylates, monoamines and diamines and/or monofunctional or difunctional amino alcohols are used as component A5), alone or in a mixture. Preferred diamines are those which are more reactive towards the isocyanate groups than is water, since the lengthening of the polyesterurethane (meth)acrylate takes place optionally in an aqueous medium. More preferably the diamines are selected from the group of ethylenediamine, 1,6-hexamethylenediamine, isophoronediamine, 1,3-phenylenediamine, 1,4-phenylenediamine, piperazine, 4,4'-diphenylmethanediamine, amino-functional polyethylene oxides, amino-functional polypropylene oxides (known under the name JEFFAMINE D series (Huntsman Corp. Europe, Zavantem, Belgium) and hydrazine. Especially preferred are isophoronediamine and ethylenediamine, and more particularly preferred is the mixture of isophoronediamine and ethylenediamine.

For the purpose of accelerating the reaction, preference is given to using catalysts (component A7). For this purpose, suitable catalysts are urethanization catalysts known per se to the skilled person, such as tertiary amines or Lewis acids, for example. Examples include organotin compounds, such as dibutyltin diacetate, dibutyltin dilaurate, dibutyltin bisacetoacetonate, for example, tin salts such as, for example, tin octoate, or zinc compounds, such as, for example, zinc acetylacetonate or zinc octoate. Likewise conceivable is the use of Lewis-acidic metal compounds containing molybdenum, vanadium, zirconium, caesium, bismuth or tungsten, such as bismuth octoate or zirconium octoate, for example Preference is given to using a catalyst which is not an organometallic compound, hence containing no covalent metal-carbon bonds. Particularly preferred for use is tin octoate or bismuth octoate.

Component A1) is used in amounts of 40 to 60 wt %, preferably of 42 to 55 wt %, more preferably 45 to 50 wt %, component A2) in amounts of 30 to 55 wt %, preferably of 33 to 50 wt %, more preferably of 35 to 42 wt %, component A3) in amounts of 3 to 15 wt %, preferably of 4 to 10 wt %, more preferably of 5 to 8 wt %, component A4) in amounts of 1 to 20 wt %, preferably of 1.5 to 15 wt %, very preferably of 2 to 8 wt %, component A5) in amounts of 1 to 20 wt %, preferably of 1.5 to 15 wt %, more preferably of 2 to 10 wt %, component A6) in amounts of 0 to 10 wt %, preferably of 1 to 5 wt %, very preferably of 1.5 to 5 wt %, and component A7) in amounts of 0 to 5 wt %, preferably of 0.001 to 1 wt %, very preferably of 0.001 to 0.1 wt %.

Additionally provided by the invention is a process for preparing polyurethane dispersions, characterized in that in a first step a polyurethane prepolymer is obtained by reaction of components A1) to A4), optionally in the presence of a catalyst A7) and optionally in a solvent, in one or more reaction steps, with a neutralizing agent A6) for generating the ionic groups necessary for dispersal being able to be added before, during or after the preparation of the adduct from A1) to A4), followed by a dispersing step by addition of water to the adduct of A1) to A4) or transfer of the adduct of A1) to A4) into an aqueous initial charge, with chain extension by means of component A5) taking place before, during or after the dispersing, and optionally followed by a third step wherein the dispersion is freed from the organic solvent by distillation.

The invention accordingly further provides dispersions prepared by the above process, having a solids content of 25-60%, preferably of 30-50% and more preferably of 35-45%, and an average particle size of 20 to 300 nm, preferably of 30 to 200 nm.

The reaction of the isocyanate-containing components A2) with the isocyanate-reactive components A1), A3) and A4) takes place in a urethanization reaction known per se to the skilled person, optionally with assistance of a catalyst A7).

In this reaction, the isocyanate-containing compounds A2) are reacted with the isocyanate-reactive components A1), A3) and A4) in an equivalents ratio of 1.6:1 to 1.05:1, preferably 1.5:1 to 1.1:1 and more preferably 1.4:1 to 1.2:1.

The reaction is carried out at temperatures of 25 to 100° C., preferably 40 to 80° C., over a period of 2 to 30 hours, preferably 4 to 15 hours.

The course of the reaction may be monitored by suitable instruments installed in the reaction vessel and/or from analyses on samples taken. Suitable methods are known to the skilled person. Such methods are, for example, viscosity measurements, measurements of NCO content, measurement of refractive index, measurement of OH content, gas chromatography (GC), nuclear magnetic resonance spectroscopy (NMR), infrared spectroscopy (IR) and near-infrared spectroscopy (NIR). Preference is given to IR spectroscopy for the monitoring of the free NCO groups present (for aliphatic NCO groups, the band in the IR spectrum is located at around $\nu=2272\ cm^{-1}$), and to GC analyses for unreacted compounds from component A2).

The remaining NCO groups are reacted wholly or partly with the chain-extending amine (component A5). The fraction of the conversion of the remaining NCO groups here is referred to as the degree of chain extension. Preference in this case is given to a degree of chain extension of 50% to 105%, more preferably of 60% to 95% and very preferably of 65% to 80%. The assumption is that the remaining NCO groups are consumed by reaction with water in the subsequent process, and so lead very largely to chain extension by formation of urea.

The process of the invention is preferably carried out in a stirred reactor.

For preparing the dispersions of the invention it is possible to use all methods known from the prior art, such as emulsifier/shearing-force, acetone, prepolymer mixing, melt emulsification, ketimine and spontaneous solids dispersing methods or derivatives thereof. A compilation of these methods is found in Methoden der Organischen Chemie, Houben-Weyl, 4th edition, Volume E20/Part 2 on page 1682, Georg Thieme Verlag, Stuttgart, 1987. Preference is given to the melt emulsification method and the acetone method. The acetone method is particularly preferred.

In the process of the invention, solvents and/or reactive diluents may be used optionally at any point.

Suitable solvents are inert towards the functional groups present in the process product, from the moment of addition to the end of the process. Suitability is possessed, for example, by solvents used in the coatings industry, such as hydrocarbons, ketones and esters, examples being toluene, xylene, isooctane, acetone, butanone, methyl isobutyl ketone, ethyl acetate, butyl acetate, tetrahydrofuran, N-methylpyrrolidone, dimethylacetamide, dimethylformamide Preference is given to using a water-miscible solvent; acetone is used with particular preference.

The polyurethanes A) of the invention and the dispersions prepared using them are especially suitable as binders for coating compositions. Accordingly a further preferred embodiment of the present invention relates to the use of the polyurethane A) of the invention as a binder in a coating composition. Said coating composition is more preferably a one-component coating composition, i.e. a coating composition to which no further compound is added which brings about crosslinking of individual molecules of the polyurethane A). It is further preferred for the coating composition to be aqueous.

In view of the particular suitability of the polyurethane A) of the invention, and/or of the dispersion prepared from it, as a binder, a further preferred embodiment of the present invention relates to coating compositions comprising at least one polyurethane dispersion comprising the polyurethane A) and B) optionally further aqueous binders, C) one or more siccatives, D) optionally solvents and/or water, E) optionally auxiliaries and adjuvants.

In one particularly preferred embodiment of the present invention, the coating composition of the invention contains no binder other than one or more polyurethanes A) of the invention.

In one especially preferred embodiment of the present invention, the coating composition of the invention consists of at least one polyurethane A), one siccative C) and at least one further component selected from the group consisting of components B), D) and E).

As compounds of component B) it is possible to use other aqueous binders, such as, for example, polyacrylate dispersions, polyacrylate emulsions, other alkyd dispersions, polyurethane-polyacrylate dispersions, polyurethane dispersions, aqueous epoxy resins or else crosslinker dispersions, such as polyisocyanates, for example, which may optionally also contain incorporated groups with hydrophilizing effect, and contain free or blocked isocyanate groups, or polyaziridines, or amine crosslinkers, which may be based on melamine, for example.

The oxidative drying is accelerated by addition of one or more siccatives (component C). Effective siccatives are oxides, salts or complexes of metals such as, for example, cobalt, vanadium, manganese, copper, iron, zirconium, calcium or zinc.

As component D) it is possible optionally, as well as water, to use organic solvents as well. Examples include various ester alcohols, esters, glycol ethers or glycol benzoates such as, for example, ethylene glycol, propylene glycol, butyl glycol, butyl diglycol, propylene glycol n-butyl ether (PnB), dipropylene glycol monobutyl ether (DPnB), dipropylene glycol monomethyl ether (DPM), 2,2,4-trimethyl-1,3-pentanediol monoisobutyrate (TEXANOL), triethylene glycol-di-2-ethylhexanoate (TEGDO), 2-ethylhexyl benzoate (2-EHB) or diethylene glycol dibenzoate (DEGDB).

Auxiliaries and adjuvants (component E) present for increasing the weather stability of the cured coating film may include, among others, UV absorbers and/or HALS stabilizers. Preferred is a combination of UV absorbers and HALS stabilizers. The former advantageously have an absorption range of 390 nm at most, examples being UV absorbers such as triphenyltriazine products (e.g. TINUVIN 400 (Ciba Spezialitätenchemie GmbH, Lampertheim, DE)), benzotriazoles (e.g. TINUVIN 622 (Ciba Spezialitatenchemie GmbH, Lampertheim, DE)) or oxalic dianilides (e.g. SANDUVOR 3206 (Clariant, Muttenz, CH)), and are added at 0.5-3.5 wt %, based on resin solids. Suitable HALS stabilizers are available commercially (e.g. TINUVIN 292 or TINUVIN 123 (Ciba Spezialitatenchemie GmbH, Lampertheim, DE) or SANDUVOR 3258 (Clariant, Muttenz, CH)). Preferred amounts are 0.5-2.5 wt % based on resin solids.

Likewise present in E) may be further auxiliaries and adjuvants known within coatings technology, such as, for example, pigments including metallic effect pigments, dyes, matting agents, fillers, flow-control, wetting and deaerating additives, slip additives, nanoparticles, anti-yellowing additives, thickeners, and additives for reducing surface tension.

The coating compositions of the invention are applied to the material to be coated using the techniques that are customary and known within coating technology, such as injecting, knifecoating, rolling, pouring, dipping, spincoating, brushing or spraying, or by printing technologies such as screen, gravure, flexographic or offset printing, and also by transfer techniques.

Examples of suitable substrates are wood, metal, including in particular metal as used in the applications of so-called wire, coil, can or container coating, and additionally plastic, including plastic in the form of films, especially ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM, and UP (abbreviations according to DIN 7728T1), paper, leather, textiles, felt, glass, wood-based materials, cork, inorganically bonded substrates such as wood and fibre cement boards, electronic assemblies or mineral substrates. It is also possible for substrates consisting of various materials from those specified above to be coated, or for substrates which have already been coated to be coated, such as aircraft, vehicles or ships, and also parts thereof, especially vehicle bodies or ancillary components. Also possible is the merely temporary application of the coating compositions to a substrate, followed by partial or complete curing thereof and, optionally, by redetachment thereof, in order to produce films, for example.

The coating compositions of the invention are particularly suitable for the coating of wood, wood-containing substrates, cork and cellulose fibre-containing substrates, such as paper or paperboard. The coating compositions of the invention are especially suitable for the coating of wood.

For curing, water or, optionally, solvent present, for example, may be wholly or partly removed by flashing.

Flashing may be accompanied or followed by thermal curing.

If necessary, the thermal curing may take place at room temperature or else at elevated temperature, preferably at 0-160° C., preferably at 10-60° C., more preferably at 15-35° C.

The applied film thicknesses (prior to curing) are typically between 0.5 and 5000 μm, preferably between 5 and 1000 μm, more preferably between 15 and 200 μm. Where solvent is used, it is removed after application and prior to curing, by the usual techniques.

Additionally provided by the invention are substrates coated with the coating compositions of the invention which comprise the polyurethane dispersions of the invention.

EXAMPLES

All percentages are based, unless otherwise indicated, on weight percent.

The solids content of the polyurethane dispersion was determined gravimetrically following evaporation of all non-volatile constituents according to DIN EN ISO 3251.

The NCO contents in % were determined by back-titration with 0.1 mol/1 hydrochloric acid following reaction with butylamine, based on DIN EN ISO 11909.

The average particle size was determined by laser correlation spectroscopy.

The flow time was determined according to DIN 53211 using the 4 mm DIN cup.

The OH number was determined according to DIN 53240-2.

The acid number was determined according to DIN EN ISO 2114.

OH-Functional Triglyceride (Component A1)

A 5 l reactor with top-mounted distillation unit was charged with 3200 g of castor oil and 1600 g of soybean oil and with 2.4 g of lithium hydroxide. A stream of nitrogen (5 l/h) was passed through the reactants. Heating to 240° C. took place over the course of 140 minutes. Cooling took place after 7 hours at 240° C. OH number: 109 mg KOH/g solids, acid number: 3.2 mg KOH/g solids, iodine number: 97 mg $I_2$/100 g solids.

Example 1: Inventive Aqueous Polyurethane Dispersion

A 2000 ml four-necked glass flask with reflux condenser, heatable oil bath, mechanical stirrer and internal thermometer was charged with 195.5 g of OH-functional triglyceride (component A1), 26.2 g of 1,4-cyclohexanedimethanol (component A3), 12.9 g of dimethylolpropionic acid (component A4) and 165.7 g of 4,4'-diisocyanato-dicyclohexylmethane (DESMODUR W, Covestro Deutschland AG, Leverkusen, component A2) in 91 g of acetone, 14 mg of tin octoate were added, and the mixture was heated to 60° C. and stirred for about 8 hours until the theoretical NCO content reached 2.98%. At that point the reaction mixture was diluted with a further 286 g of acetone, cooled to 30° C. and neutralized by addition of 10.96 g of ethyldiisopropylamine After 15 minutes of further stirring, a mixture of 3.48 g of ethylenediamine and 9.85 g of isophoronediamine (component A5) in solution in 77 g of water was added slowly dropwise. For dispersal, 643 g of water were introduced into the initially clear solution. Finally the acetone was removed from the dispersion by distillation under a gentle vacuum. This gave an aqueous polyurethane dispersion having a solids content of 36.1 wt %, a flow time of 17 sec, an average particle size of 103 nm and a pH of 7.4.

Example 2: Non-Inventive Aqueous Polyurethane Dispersion (Linear Instead of Cyclic Diols)

A 2000 ml four-necked glass flask with reflux condenser, heatable oil bath, mechanical stirrer and internal thermometer was charged with 171.6 g of OH-functional triglyceride (component A1), 14.1 g of 1,6-hexanediol and also 10.7 g of 1,4-butanediol (analogous to component A3), 14.2 g of dimethylolpropionic acid (component A4) and 182.0 g of 4,4'-diisocyanato-dicyclohexylmethane (DESMODUR W, Covestro Deutschland AG, Leverkusen, component A2) in 99.7 g of acetone, 16 mg of tin octoate were added, and the mixture was heated to 60° C. and stirred for about 8 hours until the theoretical NCO content reached 3.25%. At that point the reaction mixture was diluted with a further 314 g of acetone, cooled to 30° C. and neutralized by addition of 12.03 g of ethyldiisopropylamine. After 15 minutes of further stirring, a mixture of 3.82 g of ethylenediamine and 10.81 g of isophoronediamine (component A5) in solution in 60 g of water was added slowly dropwise. For dispersal, 707 g of water were introduced into the initially clear solution. Finally the acetone was removed from the dispersion by distillation under a gentle vacuum. This gave an aqueous polyurethane dispersion having a solids content of 34.8 wt %, a flow time of 14 sec, an average particle size of 64 nm and a pH of 7.3.

Example 3: Non-Inventive Aqueous Polyurethane Dispersion (IPDI Instead of 4,4'-diisocyanatodicyclohexylmethane)

A 2000 ml four-necked glass flask with reflux condenser, heatable oil bath, mechanical stirrer and internal thermometer was charged with 185.9 g of OH-functional triglyceride (component A1), 23.3 g of 1,4-butanediol (analogous to component A3), 15.4 g of dimethylolpropionic acid (component A4) and 166.5 g of isophorone diisocyanate (DESMODUR I, Covestro Deutschland AG, Leverkusen, analogous to component A2) in 108 g of acetone, 17 mg of tin octoate were added, and the mixture was heated to 60° C. and stirred for about 8 hours until the theoretical NCO content reached 3.5%. At that point the reaction mixture was diluted with a further 343 g of acetone, cooled to 30° C. and neutralized by addition of 12.60 g of ethyldiisopropylamine After 15 minutes of further stirring, a mixture of 4.14 g of ethylenediamine and 11.72 g of isophoronediamine (component A5) in solution in 65 g of water was added slowly dropwise. For dispersal, 663 g of water were introduced into the initially clear solution. Finally the acetone was removed from the dispersion by distillation under a gentle vacuum. This gave an aqueous polyurethane dispersion having a solids content of 35.8 wt %, a flow time of 13 sec, an average particle size of 140 nm and a pH of 7.16.

Coating Formulation and Performance Testing

The polyurethane dispersions prepared were combined under shear with the formulation constituents in a disperser at 1500 revolutions/min in succession in accordance with Table 1. The resulting coating material was applied three times with a brush in a thin coat to an oak plaque, flashed off for about 3 hours in each case, with the first two coats being subsequently sanded with abrasive paper (P180).

TABLE 1

Formulation of the dispersions

| Component | Function | Amount (parts by weight per 100 parts) |
|---|---|---|
| Dispersion from Example 1, 2, 3 | Binder | 91.2 |
| BYK 208, Altana AG, Germany | Defoamer | 1.0 |
| BYK 342, Altana AG, Germany | Surface additive | 0.4 |
| BYK 349, Altana AG, Germany | Surface additive | 0.2 |
| Butyl diglycol/propylene glycol n-butyl ether 1:1 (weight fractions) | Co-solvent | 6.8 |
| Water | | 0.1 |
| Borchi OXY COAT 101, OMG Borchers GmbH, Germany | Siccative | 0.3 |
| TAFIGEL Pur 45, Münzing Chemie GmbH, Germany | Thickener | 0.1 |

The gloss measurement and the determination of the haze were carried out using the Haze Gloss Meter 4601 from BYK Gardner, in accordance with DIN 67530.

The König pendulum hardness was tested according to DIN EN ISO 1522.

The testing against chemicals, such as water or 48% ethanol, took place according to DIN 68861-1 and DIN EN 12720 on an oak plaque. (Rating 5: coating remains unchanged, rating 1: severe alteration of the surface, e.g. dissolution of the coating material)

The heel mark resistance was determined by abruptly striking the film surface with a commercial footwear repair sole. For this purpose the footwear sole is clamped into a pendulum-like apparatus, swivelled out and swung over the coated wooden plaque. The extent of the damage (after removal of the abrasive rubber) was assessed on a scale from 1 to 5, where (similar to the chemical resistance) 1 denotes complete destruction of the film and 5 stands for a completely undamaged film.

TABLE 2

Test results on oak

| Examples | 1 Inventive | 2 (comparative) | 3 (comparative) | PU dispersion 1 from EP1198487B as per [0050]* |
|---|---|---|---|---|
| Gloss 20° | 64 | 16 | 71 | No report |
| Gloss 60° | 83 | 53 | 88 | No report |
| Haze | 105 | 397 | 148 | No report |
| Pendulum damping 7 d 23° C. [s] | 69 | 80 | 69 | No report |
| Water resistance 24 h-immediate | 5 | 5 | 5 | 5 |
| Water resistance 24 h-after recovery | 5 | 5 | 5 | No report |
| Water resistance 24 h-scratch resistance | 5 | 5 | 5 | No report |
| Ethanol resistance 5 min-immediate | 5 | 4 | 3 | 3 |
| Ethanol resistance 5 min-after recovery | 5 | 5 | 5 | No report |
| Ethanol resistance 5 min-scratch resistance | 5 | 3.5 | 3 | No report |
| Ethanol resistance 30 min-immediate | 3 | 3 | 3 | 2 |
| Ethanol resistance 30 min-after recovery | 5 | 5 | 4.5 | No report |
| Ethanol resistance 30 min-scratch resistance | 5 | 3 | 3 | No report |
| Heel mark resistance 15 d | 4.5 | 4 | 1.5 | 4 |

*The values in EP1198487 were measured on a different scale, and in this table were transferred to the DIN scale used here, for the purpose of better comparison.

Here, for purposes of comparison, the resistance of PU dispersion 1, exhibiting only moderate chemical resistance with respect to ethanol, was inserted from the description of EP1198487. The increase in the amount of OH functional triglyceride in all three examples leads in each case to a better chemical resistance; in the case of the isophorone diisocyanate-based dispersion (Example 3), the effect is not particularly pronounced and here there is also a significantly impaired heel mark resistance observed. This problem is solved by the use of 4,4'-diisocyanatodicyclohexylmethane as isocyanate. In that case, however, as shown in Example 2, there is a marked hazing and loss of gloss. Only through the use of a cyclic diol is it possible to prevent this effect, and to observe resistances that are improved again.

Various aspects of the subject matter described herein are set out in the following numbered clauses:

1. Polyurethane A), which comprises at least as synthesis components

A1) 40 to 60 wt % of an oxidatively drying, OH-functional triglyceride,

A2) 30 to 55 wt % of 4,4'-diisocyanato-dicyclohexylmethane,

A3) 3 to 15 wt % of one or more cycloaliphatic diols,

A4) 1 to 20 wt % of a compound having at least one isocyanate-reactive group and at least one ionic and/or potentially ionic function, A5) 1 to 20 wt % of one or more mono-, di- or triamines having a molecular weight of less than 300 g/mol, A6) 0 to 10 wt % of a neutralizing agent for converting a potentially ionic function, where present, of component A4) into an ionic function, and A7) 0 to 5 wt % of a urethanization catalyst, characterized in that the figure in wt % is based on the total amount of all synthesis components, and the sum total of all the components does not exceed 100%.

2. Polyurethane according to clause 1, characterized in that component A1) used comprises an OH-functional triglyceride prepared by transesterification of castor oil with soybean oil or by dehydration of castor oil.

3. Polyurethane according to clause 1 or 2, characterized in that component A3) used comprises cyclohexanedimethanol.

4. Polyurethane according to any of clauses 1 to 3, characterized in that component A4) used comprises dimethylolpropionic acid.

5. Polyurethane according to any of clauses 1 to 4, characterized in that component A5) used comprises a diamine.

6. Polyurethane according to any of clauses 1 to 5, characterized in that component A5) used comprises a mixture of ethylenediamine and isophoronediamine 7. Polyurethane according to any of clauses 1 to 6, characterized in that component A6) used comprises triethylamine or ethyldiisopropylamine 8. Polyurethane according to any of clauses 1 to 6, characterized in that component A6) used comprises lithium hydroxide, sodium hydroxide or potassium hydroxide.

9. Polyurethane according to any of clauses 1 to 8, characterized in that component A7) used comprises no organometallic compound.

10. Polyurethane according to any of clauses 1 to 9, characterized in that it consists exclusively of the synthesis components A1) to A7).

11. Process for preparing polyurethane dispersions comprising a polyurethane according to any of clauses 1 to 10, characterized in that in a first step a polyurethane prepolymer is obtained by reaction of components A1) to A4) in one or more reaction steps, with a neutralizing agent A6) for generating the ionic groups necessary for dispersal being added before, during or after the preparation of the adduct from A1) to A4), followed by a dispersing step by addition of water to the adduct of A1) to A4) or transfer of the adduct of A1) to A4) into an aqueous initial charge, with chain extension by means of component A5) taking place before, during or after the dispersing, and followed by a third step wherein the dispersion is freed from the organic solvent by distillation.

12. Polyurethane dispersion obtainable by the process from clause 11, characterized in that the solids content in water is 25-60 wt %.

13. Coating compositions comprising at least one polyurethane dispersion according to clause 12 and B) optionally further aqueous binders, C) one or more siccatives, D) optionally solvents and/or water, E) optionally auxiliaries and adjuvants.

14. Use of the coating compositions according to clause 13 for producing coatings on wood, wood-like substrates, cork and cellulose fibre-containing substrates.

15. Substrates coated with the coating compositions according to clause 13.

The invention claimed is:

1. A polyurethane A) comprising as synthesis components:

A1) 40 to 60 wt % of an oxidatively drying, OH-functional triglyceride,

A2) 30 to 55 wt % of 4,4'-diisocyanato-dicyclohexylmethane,

A3) 3 to 15 wt % of one or more cycloaliphatic diols comprising cyclohexanedimethanol, A4) 1 to 20 wt % of a compound having at least one isocyanate-reactive group and at least one ionic and/or potentially ionic function, A5) 1 to 20 wt % of one or more mono-, di- or triamines having a molecular weight of less than 300 g/mol, A6) 0 to 10 wt % of a neutralizing agent for converting a potentially ionic function, where present, of component A4) into an ionic function, and A7) 0 to 5 wt % of a urethanization catalyst, wherein the wt % is based on the total amount of all synthesis components, and the sum total of all the components does not exceed 100%.

2. The polyurethane according to claim 1, wherein component A1) comprises an OH-functional triglyceride prepared by transesterification of castor oil with soybean oil or by dehydration of castor oil.

3. The polyurethane according to claim 1, wherein component A4) comprises dimethylolpropionic acid.

4. The polyurethane according to claim 1, wherein component A5) comprises a diamine.

5. The polyurethane according to claim 1, wherein component A5) comprises a mixture of ethylenediamine and isophoronediamine.

6. The polyurethane according to claim 1, wherein component A6) comprises triethylamine or ethyldiisopropylamine.

7. The polyurethane according to claim 1, wherein that component A6) used comprises lithium hydroxide, sodium hydroxide or potassium hydroxide.

8. The polyurethane according to claim 1, wherein component A7) comprises no organometallic compound.

9. A polyurethane A) consisting of as synthesis components:

A1) 40 to 60 wt % of an oxidatively drying, OH-functional triglyceride,

A2) 30 to 55 wt % of 4,4'-diisocyanato-dicyclohexylmethane,

A3) 3 to 15 wt % of one or more cycloaliphatic diols comprising cyclohexanedimethanol, A4) 1 to 20 wt % of a compound having at least one isocyanate-reactive group and at least one ionic and/or potentially ionic function, A5) 1 to 20 wt % of one or more mono-, di- or triamines having a molecular weight of less than 300 g/mol, A6) 0 to 10 wt % of a neutralizing agent for converting a potentially ionic function, where present, of component A4) into an ionic function, and A7) 0 to 5 wt % of a urethanization catalyst, wherein the wt % is based on the total amount of all synthesis components, and the sum total of all the components does not exceed 100%.

10. A process for preparing polyurethane dispersions comprising a polyurethane according to claim 1, wherein in a first step a polyurethane prepolymer is obtained by reaction of components A1) to A4) in one or more reaction steps, with a neutralizing agent A6) for generating the ionic groups necessary for dispersal being added before, during or after the preparation of the adduct from A1) to A4), followed by a dispersing step by addition of water to the adduct of A1) to A4) or transfer of the adduct of A1) to A4) into an aqueous initial charge, with chain extension by means of component A5) taking place before, during or after the dispersing.

11. The polyurethane dispersion obtained by the process according to claim 10, wherein the solids content in water is 25-60 wt %.

12. A coating composition comprising at least one polyurethane dispersion made according to the process of claim 11 and B) optionally further aqueous binders, C) one or more siccatives, D) optionally solvents and/or water, E) optionally auxiliaries and adjuvants.

13. The coating composition according to claim 12 wherein the composition is applied to a substrate selected from the group consisting of wood, wood-containing substrates, cork and cellulose fibre-containing substrates.

14. A substrate coated with the coating compositions according to claim 12.

* * * * *